United States Patent [19]

Ohnishi et al.

[11] Patent Number: 5,258,694
[45] Date of Patent: Nov. 2, 1993

[54] CONTROL DEVICE FOR ULTRASONIC MOTOR

[75] Inventors: Kazumasa Ohnishi; Masayuki Tanaka; Youichi Kimura, all of Nagaoka, Japan

[73] Assignee: Alps Electric Co., Ltd., Tokyo, Japan

[21] Appl. No.: 876,827

[22] Filed: Apr. 29, 1992

Related U.S. Application Data

[63] Continuation of Ser. No. 601,963, Oct. 22, 1990.

[30] Foreign Application Priority Data

Dec. 15, 1989 [JP] Japan .................................. 1-325257

[51] Int. Cl.$^5$ ............................................. H01L 41/08
[52] U.S. Cl. ..................... 318/135; 310/316; 310/323; 318/460
[58] Field of Search ............... 318/466, 609, 640, 657, 318/616, 617, 135; 310/323, 328, 329, 316, 317, 318

[56] References Cited

U.S. PATENT DOCUMENTS

| | | | |
|---|---|---|---|
| 4,613,782 | 9/1986 | Mori | 310/323 |
| 4,716,347 | 12/1987 | Fujimoto | 318/460 |
| 4,853,579 | 8/1989 | Kawasaki et al. | 310/323 |
| 4,914,336 | 4/1990 | Yamasaki | 310/323 |
| 4,929,859 | 5/1990 | Suzuki et al. | 310/328 |
| 4,952,834 | 8/1990 | Okada | 310/323 |

Primary Examiner—William M. Shoop, Jr.
Assistant Examiner—John W. Cabeca
Attorney, Agent, or Firm—Guy W. Shoup; Patrick T. Bever

[57] ABSTRACT

A control device for an ultrasonic motor for controlling to drive the ultrasonic motor according to a logical AND operation between a control pulse having a duty ratio changing from 100% to 0% according to a moving position of the ultrasonic motor and a driving signal having a resonance frequency of the ultrasonic motor. Accordingly, after starting the ultrasonic motor at a maximum speed, a moving speed of the ultrasonic motor can be gradually reduced until it reaches a target position, and when reaching the target position, the ultrasonic motor can be stopped precisely at the target position.

1 Claim, 4 Drawing Sheets

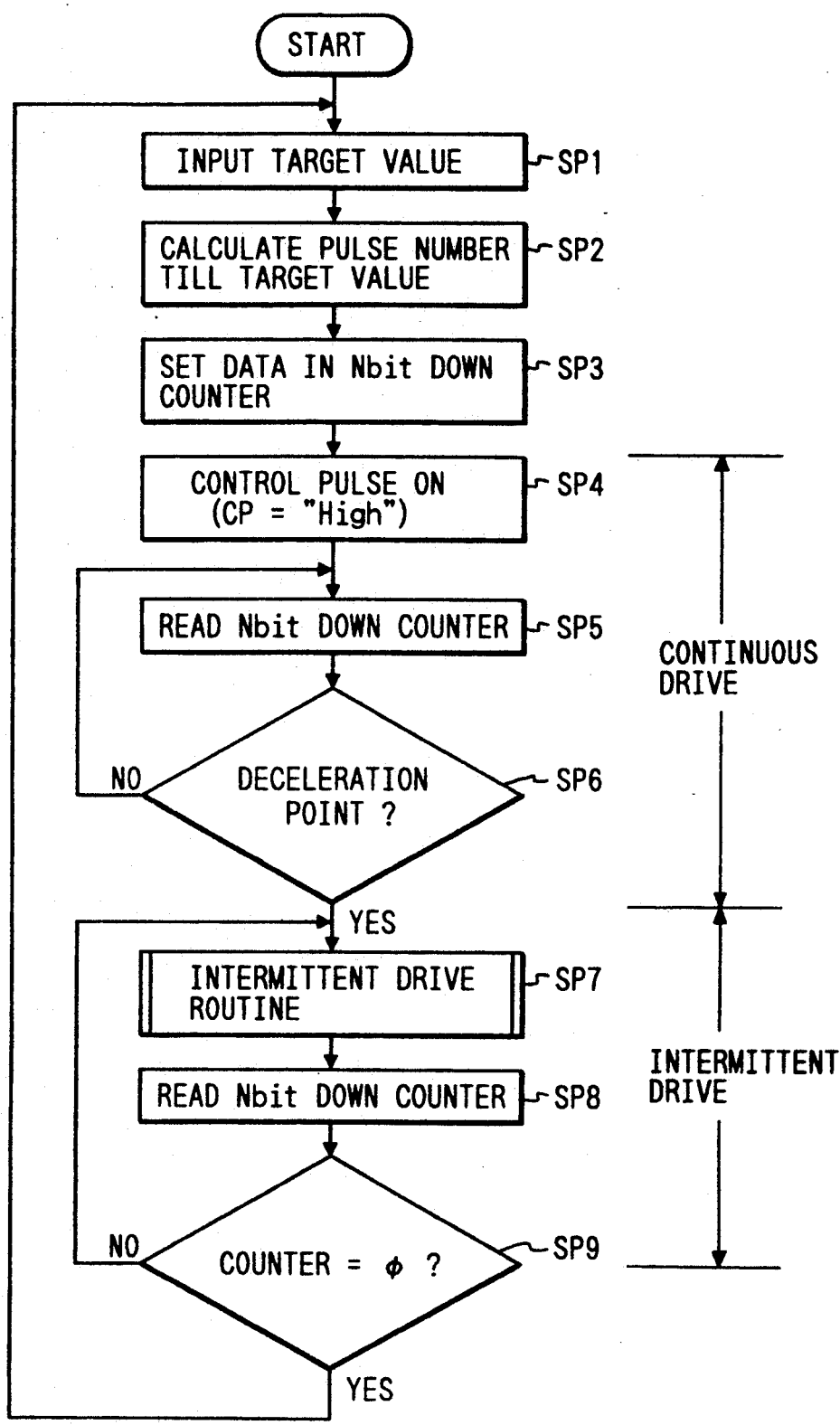

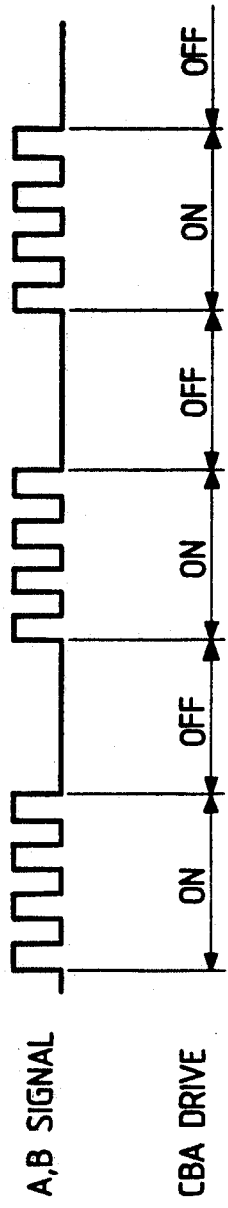
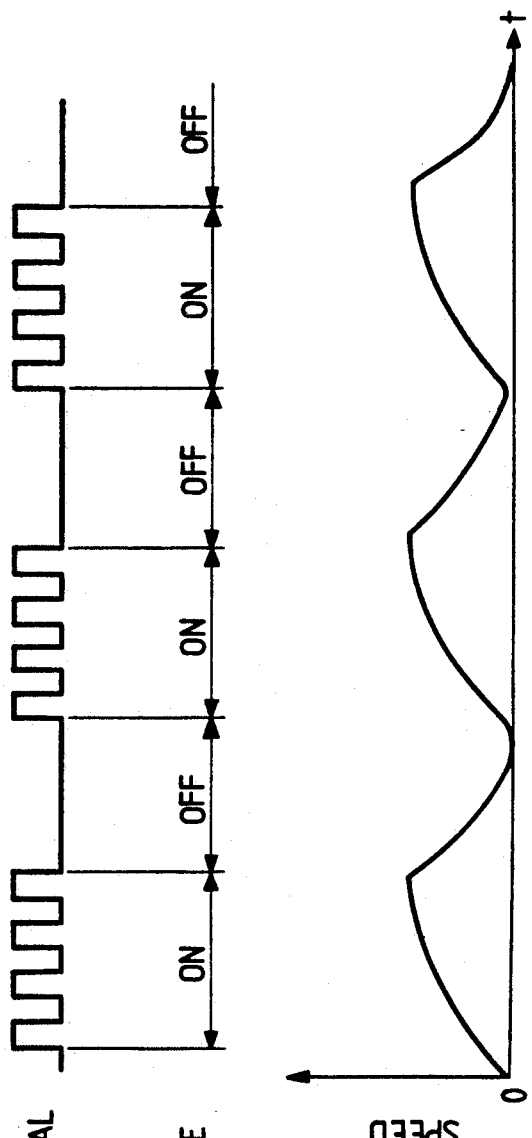
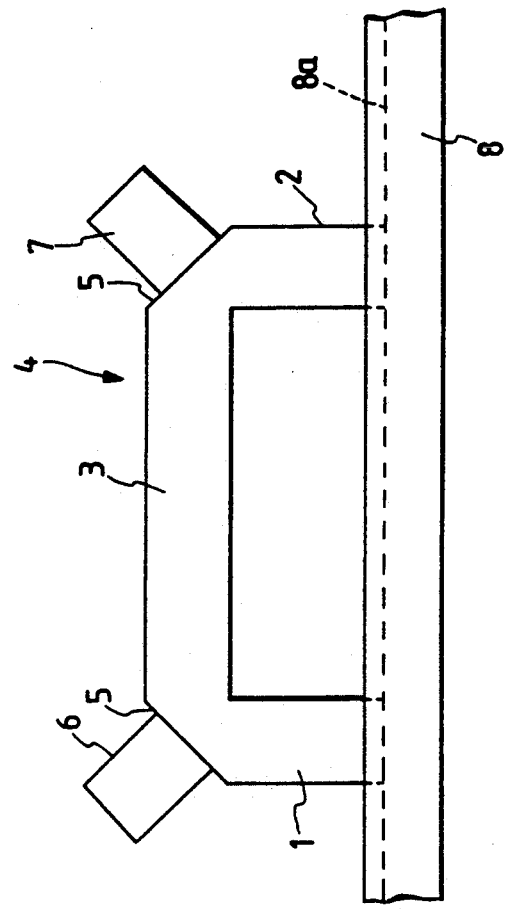
FIG. 4(a)
FIG. 4(b)
FIG. 4(c)
FIG. 5

CONTROL DEVICE FOR ULTRASONIC MOTOR

This application is a continuation of application Ser. No. 07/601,963, filed Oct. 22, 1990.

BACKGROUND OF THE INVENTION

The present invention relates to a control device for an ultrasonic motor for controlling to drive the ultrasonic motor to a target position according to a driving signal having a resonance frequency of the ultrasonic motor.

Conventionally known is a control device for controlling to continuously drive an ultrasonic motor to a target position by continuously applying a driving signal to the ultrasonic motor. According to such a control device, the ultrasonic motor is driven to the target position at a constant speed by the driving signal having a resonance frequency of the ultrasonic motor. However, in driving the ultrasonic motor to the target position by the conventional control device, the ultrasonic motor is rapidly stopped at the target position. As a result, a shock is generated upon rapid stoppage of the ultrasonic motor, and a positioning accuracy is reduced.

SUMMARY OF THE INVENTION

It is accordingly an object of the present invention to improve a positioning accuracy of an ultrasonic motor.

It is another object of the present invention to realize smooth reduction of a moving speed of the ultrasonic motor by increasing the number of deceleration points where the moving speed of the ultrasonic motor is reduced.

In accordance with the invention, a control device for an ultrasonic motor for controlling to drive the ultrasonic motor to a target position according to a driving signal having a resonance frequency of the ultrasonic motor, the control device comprising detecting means for detecting a moving position of the ultrasonic motor, a control unit for outputting a control pulse having a duty ratio changing from 100% to 0% until the ultrasonic motor reaches the target position from a start position according to a detection data from the detecting means. The control device further comprises an AND circuit for inputting the driving signal and the control pulse, and a driving circuit for driving the ultrasonic motor according to an output signal from the AND circuit.

BRIEF DESCRIPTION OF THE DRAWINGS

FIG. 3 is a flowchart of the operation;

FIGS. 4a, 4b, and 4c show the intermittent operation according to the present invention; and FIG. 5 is a schematic side view of an ultrasonic linear motor as a control object according to the present invention.

DETAILED DESCRIPTION OF THE PREFERRED EMBODIMENT

Figure 1:
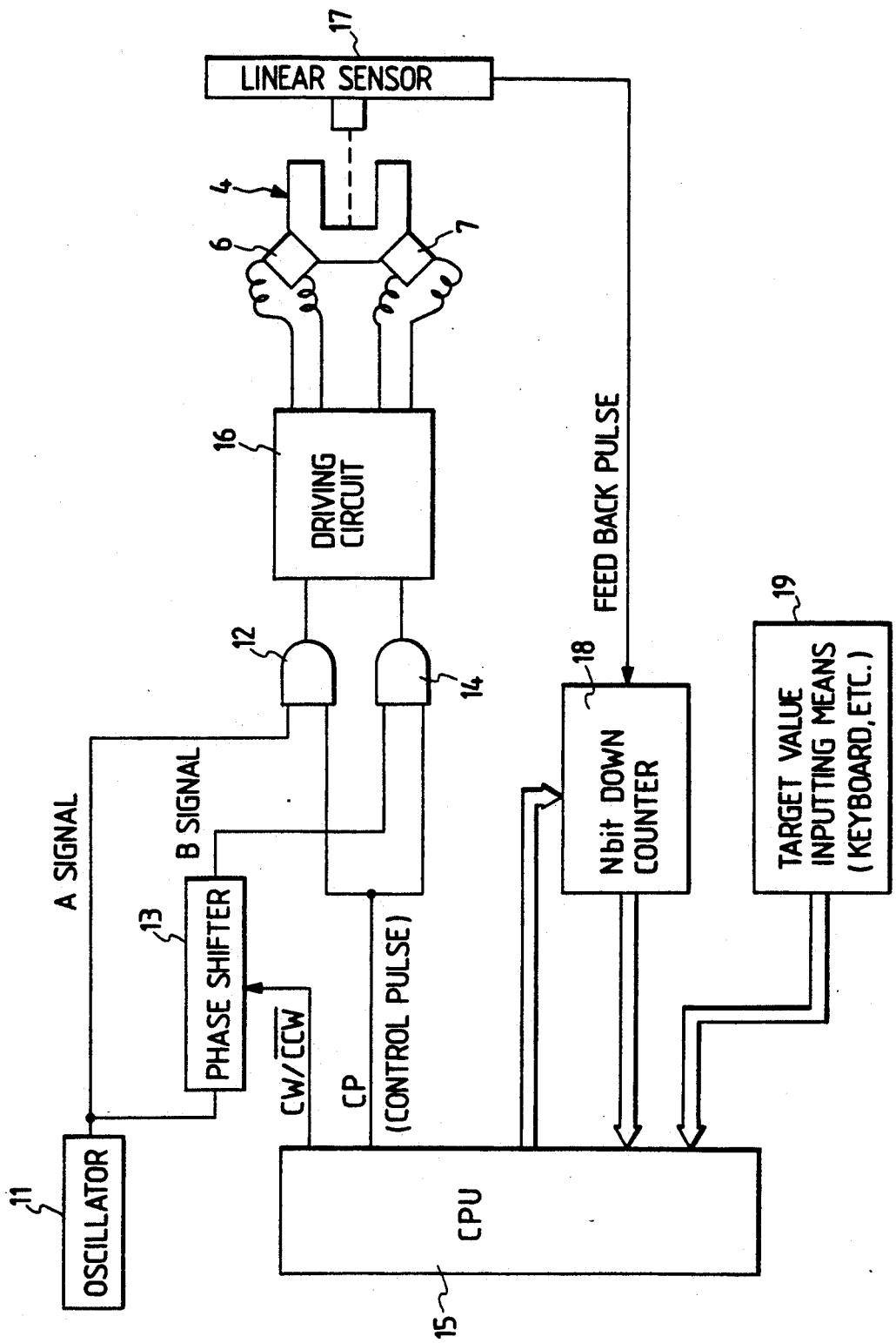
FIG. 1 is a block diagram schematically showing the control device of the present invention.

There will now be described a preferred embodiment of the present invention with reference to the drawings.

In this preferred embodiment, an ultrasonic linear motor having a good energy efficiency previously proposed by the present applicant is used as a control object.

The construction of the ultrasonic linear motor will now be described briefly with reference to FIG. 5.

The ultrasonic linear motor includes a pair of parallel leg portions 1 and 2. The leg portions 1 and 2 are connected with each other at their upper ends by a body portion 3. The leg portions 1 and 2 and the body portion 3 are formed of an elastic material, and have a substantially square cross section. Thus, they constitute an oscillating body 4 having a generally inverted U-shape. A pair of corner portions of the oscillating body 4 is chamfered at an angle of 45 degrees with respect to axes of the leg portions 1 and 2 and the body portion 3 to form a pair of mounting surfaces 5. A pair of piezoelectric elements 6 and 7 are mounted on the mounting surfaces 5. The piezoelectric elements 6 and 7 are formed from a stacked piezoelectric actuator or a single-plate piezoelectric ceramics. The piezoelectric elements 6 and 7 are driven to expand and contract in directions perpendicular to the mounting surfaces 5. The oscillating body 4 is set in such a manner that lower ends of the leg portions 1 and 2 contact an upper surface of a rail 8. The upper surface of the rail 8 is formed with a groove 8a extending in a longitudinal direction of the rail 8 and having a width permitting engagement of the lower ends of the leg portions 1 and 2.

The ultrasonic linear motor as constructed above is driven by applying to the piezoelectric elements 6 and 7 driving signals having a resonance frequency peculiar to the ultrasonic linear motor and a phase difference of 90 degrees. The application of the driving signals to the piezoelectric elements 6 and 7 generates an elliptic or circular motion of the lower ends of the leg portions 1 and 2 with a phase difference of 90 degrees. As a result, the leg portions 1 and 2 are so operated as to kick the rail 8, so that the ultrasonic linear motor is moved on the rail 8. Assuming that the driving signal to be applied to one of the piezoelectric elements 6 and 7 is an A-signal and that the driving signal to be applied to the other is a B-signal, a moving direction of the ultrasonic linear motor is countered according to whether the phase difference between the A-signal and the B-signal is +90 degrees or −90 degrees.

The control device in this preferred embodiment is intended to control the ultrasonic linear motor as mentioned above, and the construction of the control device is shown in FIG. 1.

Referring to FIG. 1, the control device includes an oscillator 11. The oscillator 11 oscillates at a resonance frequency peculiar to the ultrasonic linear motor, and outputs the A-signal as the driving signal. The A-signal is input to one of input terminals of a first AND circuit 12. The A-signal is also input to a phase shifter 13. The phase shifter 13 converts the A-signal into the B-signal which is in turn input to one of input terminals of a second AND circuit 14. In the phase shifter 13, the phase of the A-signal input is shifted by +90 degrees or −90 degrees as the phase difference according to a direction command signal (CW/$\overline{CCW}$) from a CPU (control unit) 15 to obtain the B-signal. A control pulse CP from the CPU 15 is input to the other input terminals of the first and second AND circuits 12 and 14. The control pulse CP will be hereinafter described in connection with the operation.

Output terminals of the first and second AND circuits 12 and 14 are connected to a driving circuit 16. The driving circuit 16 drives the piezoelectric element 6 according to an output signal from the first AND circuit 12, and drives the piezoelectric element 7 according to an output signal from the second AND circuit 14.

The control device further includes a linear sensor 17 for detecting a moving amount of the ultrasonic linear motor and generating pulses of the number corresponding to the moving amount detected. Output pulses from the linear sensor 17 are input as a feedback signal to an Nbit down counter 18. The down counter 18 subtracts the output pulse number of the linear sensor 17 corresponding to the actual moving amount of the ultrasonic linear motor from a pulse number corresponding to a moving control amount of the ultrasonic linear motor applied from the CPU 15, and generates a down count value obtained above to the CPU 15. The moving control amount of the ultrasonic linear sensor is input as a target value from a target value inputting means 19 such as a keyboard to the CPU 15.

The operation of the preferred embodiment will now be described with reference to FIG. 3.

First, a target value corresponding to the moving control amount of the ultrasonic linear motor is input from the target value inputting means 19 (step SP1).

The CPU 15 computes a pulse number corresponding to a distance to a target moving position corresponding to the target value (step SP2), and sets the pulse number in the down counter 18 (step SP3).

Then, the CPU 15 outputs a control pulse CP (step SP4). The control pulse CP is a continuous signal having a duty ratio of 100% (see FIG. 2A). That is, an operation duty ratio to be obtained from the following expression is set to 100%.

Operation Period/(Operation Period + Quiescent Period)

Figure 2A:
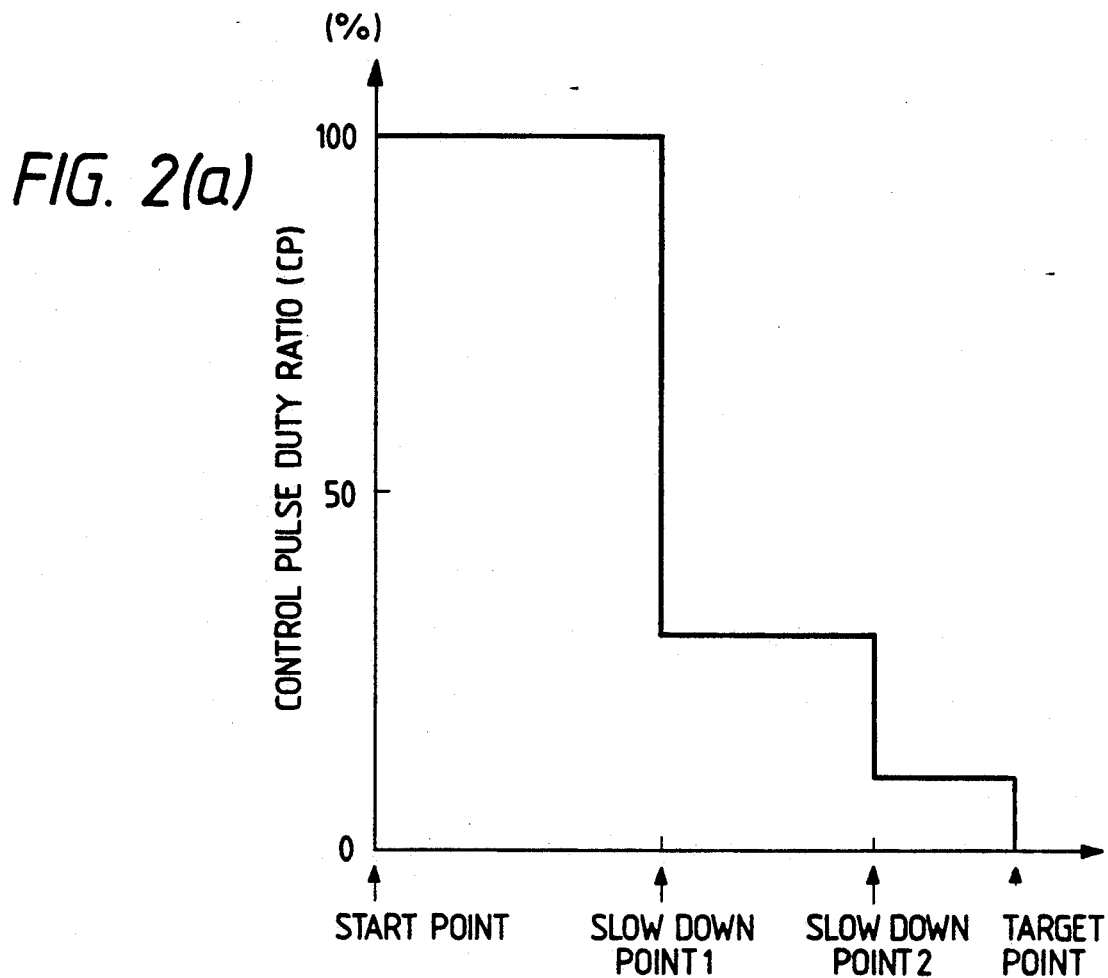
FIGS. 2A and 2B are graphs showing the operation of the present invention.
Figure 2B:
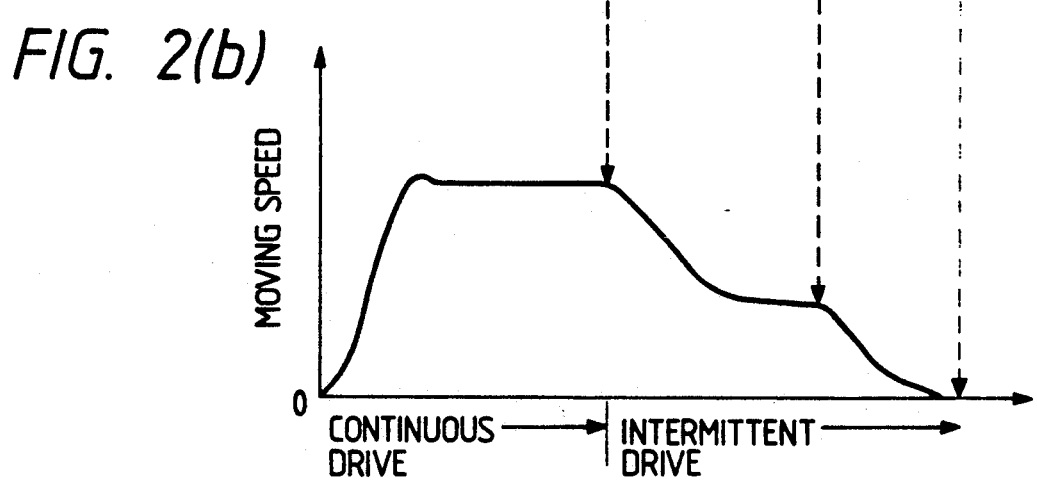

Accordingly, the AND circuits 12 and 14 continuously output the A-signal and the B-signal, respectively, and the driving circuit 16 continuously drives the ultrasonic linear motor from a start point at a maximum speed (see FIG. 2B).

An actual moving position of the ultrasonic linear motor is obtained by successively reading a count value of the down counter 18 (step SP5), and it is determined from the count value whether or not the ultrasonic linear motor has reached a predetermined slow down point (deceleration point) (step SP6). Until the predetermined slow down point is reached, the duty ratio of the control pulse CP is maintained at 100% to continuously drive the ultrasonic linear motor.

When the predetermined slow down point is reached, the program enters an intermittent drive routine (step SP7), and the duty ratio of the control pulse CP is reduced. That is, the control pulse CP is input as an intermittent signal to the AND circuits 12 and 14. Accordingly, the AND circuits 12 and 14 intermittently output the A-signal and the B-signal, respectively, and the driving circuit 16 intermittently drives the ultrasonic linear motor to thereby reduce a moving speed of the ultrasonic linear motor. Such intermittent drive is executed until the count value of the down counter 18 becomes "0" which indicates that the ultrasonic linear motor has reached a target point corresponding to the target value (steps SP7-SP9).

In the preferred embodiment shown in FIGS. 2A and 2B, two slow down points 1 and 2 are predetermined, and every time the ultrasonic linear motor reaches the slow down points 1 and 2, the duty ratio of the control pulse CP is stepwise reduced to thereby stepwise reduce the moving speed of the ultrasonic linear motor. In this manner, by increasing a frequency of reduction in the moving speed, speed reduction of the ultrasonic linear motor can be smoothed, and a positioning accuracy can also be improved.

When the ultrasonic linear motor reaches the target point, the duty ratio of the control pulse CP is set to "0". Accordingly, the outputs from the AND circuits 12 and 14 become "0" to stop the ultrasonic linear motor at the target point.

FIG. 4 illustrates the intermittent operation of the ultrasonic linear motor to be driven like a pulse motor.

As shown in FIG. 4, the A-signal and the B-signal are intermittently supplied according to the control pulse CP to thereby repeatedly drive and stop the ultrasonic linear motor. As the ultrasonic linear motor is repeatedly driven after completely stopped in this manner, a large driving force due to static friction can be obtained (such a driving force is larger than that due to kinetic friction during operation).

As described above, the control device for an ultrasonic motor according to the present invention controls to drive the ultrasonic motor according to a logical AND operation between a control pulse having a duty ratio changing from 100% to 0% according to a moving position of the ultrasonic motor and a driving signal having a resonance frequency of the ultrasonic motor. Accordingly, after starting the ultrasonic motor at a maximum speed, a moving speed of the ultrasonic motor can be gradually reduced until it reaches a target position, and when reaching the target position, the ultrasonic motor can be stopped precisely at the target position.

What is claimed is:

1. A control device for an ultrasonic linear motor for controlling to drive said ultrasonic linear motor to a target position according to a driving signal having a resonance frequency of said ultrasonic linear motor, said control device comprising:

detecting means for detecting a moving position of said ultrasonic linear motor;

a control unit for outputting a control pulse having a duty ratio changing from 100% to 0% until said ultrasonic linear motor reaches said target position from a start position, according to a detection data from said detecting means;

an AND circuit for inputting said driving signal and said control pulse;

a driving circuit for driving said ultrasonic linear motor according to an output signal from said AND circuit;

a pair of legs substantially parallel to each other;

an oscillator having a body portion connecting said legs, said body portion being disposed perpendicular to said legs and forming a pair of corner portions where the body portion is connected to the legs; and a pair of piezoelectric elements disposed at the corner portions of the body portion, wherein each piezoelectric element is oriented at an angle of 45° with respect to both the body portion and each respective leg.

* * * * *